(12) United States Patent
Hartmann et al.

(10) Patent No.: US 9,878,494 B2
(45) Date of Patent: Jan. 30, 2018

(54) DEVICE FOR CONSTRUCTING MODELS IN LAYERS

(75) Inventors: Andreas Dominik Hartmann, Stadtbergen (DE); Ingo Ederer, Geltendorf (DE)

(73) Assignee: VOXELJET AG, Friedberg (DE)

(*) Notice: Subject to any disclaimer, the term of this patent is extended or adjusted under 35 U.S.C. 154(b) by 787 days.

(21) Appl. No.: 14/241,576

(22) PCT Filed: Aug. 29, 2012

(86) PCT No.: PCT/DE2012/000870
§ 371 (c)(1),
(2), (4) Date: Apr. 28, 2014

(87) PCT Pub. No.: WO2013/029594
PCT Pub. Date: Mar. 7, 2013

(65) Prior Publication Data
US 2014/0306379 A1 Oct. 16, 2014

(30) Foreign Application Priority Data
Aug. 31, 2011 (DE) .......................... 10 2011 111 498

(51) Int. Cl.
*B29C 67/00* (2017.01)
*B29C 64/232* (2017.01)
(Continued)

(52) U.S. Cl.
CPC ........ *B29C 67/0085* (2013.01); *B29C 64/227* (2017.08); *B29C 64/232* (2017.08);
(Continued)

(58) Field of Classification Search
CPC ............ B29C 67/0085; B29C 67/0062; B29C 67/0081; B29C 67/0051; B29C 64/20;
(Continued)

(56) References Cited

U.S. PATENT DOCUMENTS 5,269,982 A 12/1993 Brotz
6,423,255 B1 * 7/2002 Hoechsmann ...... B29C 67/0081
264/113

(Continued)

FOREIGN PATENT DOCUMENTS

DE 3221357 A1 12/1983
DE 3930750 C2 3/1991
(Continued)

OTHER PUBLICATIONS

International Search Report PCT/DE2012/000870, dated Dec. 4, 2012.
(Continued)

*Primary Examiner* — Philip Tucker
*Assistant Examiner* — Jimmy R Smith, Jr.
(74) *Attorney, Agent, or Firm* — The Dobrusin Law Firm, P.C.

(57) ABSTRACT

The invention relates to a device for constructing models in layers. A region for constructing models, preferably a construction platform, and a material applying device (4, 5) for applying material onto the region are provided. The material applying device (4, 5) is arranged in a movable manner over the region. The material applying device (4, 5) is designed as a portal (1, 1') such that the material applying device can be moved over the region at least via two linear guides (2) arranged at opposite sides of the region, and the material applying device is arranged around the region such that a portal (1, 1') is formed by at least two portions that extend laterally with respect to the region. At least one additional material applying device (4, 5) for applying an additional material onto the region is provided.

20 Claims, 5 Drawing Sheets

(51) Int. Cl.
  *B29C 64/227* (2017.01)
  *B29C 64/236* (2017.01)
  *B33Y 30/00* (2015.01)
  *B29C 64/20* (2017.01)

(52) U.S. Cl.
  CPC ........ *B29C 64/236* (2017.08); *B29C 67/0055* (2013.01); *B29C 67/0062* (2013.01); *B29C 67/0081* (2013.01); *B33Y 30/00* (2014.12); *B29C 64/20* (2017.08)

(58) Field of Classification Search
  CPC ... B29C 64/227; B29C 64/232; B29C 64/236; B33Y 30/00
  USPC .......................................................... 425/375
  See application file for complete search history.

(56) References Cited

U.S. PATENT DOCUMENTS

| | | |
|---|---|---|
| 6,476,122 B1 | 11/2002 | Leyden |
| 6,485,831 B1 | 11/2002 | Fukushima et al. |
| 6,500,378 B1 | 12/2002 | Smith |
| 6,554,600 B1 | 4/2003 | Hofmann et al. |
| 6,596,224 B1 | 7/2003 | Sachs et al. |
| 6,610,429 B2 | 8/2003 | Bredt et al. |
| 6,616,030 B2 | 9/2003 | Miller |
| 6,658,314 B1 | 12/2003 | Gothait |
| 6,672,343 B1 | 1/2004 | Perret et al. |
| 6,713,125 B1 | 3/2004 | Sherwood et al. |
| 6,722,872 B1 | 4/2004 | Swanson et al. |
| 6,733,528 B2 | 5/2004 | Abe et al. |
| 6,742,456 B1 | 6/2004 | Kasperchik et al. |
| 6,764,636 B1 | 7/2004 | Allanic et al. |
| 6,827,988 B2 | 12/2004 | Krause et al. |
| 6,830,643 B1 | 12/2004 | Hayes |
| 6,838,035 B1 | 1/2005 | Ederer et al. |
| 6,855,205 B2 | 2/2005 | McQuate et al. |
| 6,896,839 B2 | 5/2005 | Kubo et al. |
| 6,972,115 B1 | 12/2005 | Ballard |
| 6,989,115 B2 | 1/2006 | Russell et al. |
| 7,004,222 B2 | 2/2006 | Ederer et al. |
| 7,037,382 B2 | 5/2006 | Davidson et al. |
| 7,048,530 B2 | 5/2006 | Gaillard et al. |
| 7,049,363 B2 | 5/2006 | Shen |
| 7,087,109 B2 | 8/2006 | Bredt et al. |
| 7,120,512 B2 | 10/2006 | Kramer et al. |
| 7,137,431 B2 | 11/2006 | Ederer et al. |
| 7,153,463 B2 | 12/2006 | Leuterer et al. |
| 7,204,684 B2 | 4/2007 | Ederer et al. |
| 7,220,380 B2 | 5/2007 | Farr et al. |
| 7,291,002 B2 | 11/2007 | Russell et al. |
| 7,296,990 B2 | 11/2007 | Devos et al. |
| 7,332,537 B2 | 2/2008 | Bredt et al. |
| 7,348,075 B2 | 3/2008 | Farr et al. |
| 7,378,052 B2 | 5/2008 | Harryson |
| 7,381,360 B2 | 6/2008 | Oriakhi et al. |
| 7,387,359 B2 | 6/2008 | Hernandez et al. |
| 7,402,330 B2 | 7/2008 | Pfeiffer et al. |
| 7,431,987 B2 | 10/2008 | Pfeiffer et al. |
| 7,435,072 B2 | 10/2008 | Collins et al. |
| 7,435,368 B2 | 10/2008 | Davidson et al. |
| 7,455,804 B2 | 11/2008 | Patel et al. |
| 7,455,805 B2 | 11/2008 | Oriakhi et al. |
| 7,497,977 B2 | 3/2009 | Nielsen et al. |
| 7,531,117 B2 | 5/2009 | Ederer et al. |
| 7,550,518 B2 | 6/2009 | Bredt et al. |
| 7,578,958 B2 | 8/2009 | Patel et al. |
| 7,597,835 B2 | 10/2009 | Marsac |
| 7,641,461 B2 | 1/2010 | Khoshnevis |
| 7,665,636 B2 | 2/2010 | Ederer et al. |
| 7,722,802 B2 | 5/2010 | Pfeiffer et al. |
| 7,807,077 B2 | 5/2010 | Ederer et al. |
| 7,736,578 B2 | 6/2010 | Ederer et al. |
| 7,748,971 B2 | 7/2010 | Hochsmann et al. |
| 7,767,130 B2 | 8/2010 | Elsner et al. |
| 7,795,349 B2 | 9/2010 | Bredt et al. |
| 7,799,253 B2 | 9/2010 | Höschmann et al. |
| 7,879,393 B2 | 2/2011 | Ederer et al. |
| 7,887,264 B2 | 2/2011 | Naunheimer et al. |
| 7,927,539 B2 | 4/2011 | Ederer |
| 8,020,604 B2 | 9/2011 | Hochsmann et al. |
| 8,096,262 B2 | 1/2012 | Ederer et al. |
| 8,186,415 B2 | 5/2012 | Marutani et al. |
| 8,349,233 B2 | 1/2013 | Ederer et al. |
| 8,506,870 B2 | 8/2013 | Hochsmann et al. |
| 8,524,142 B2 | 9/2013 | Unkelmann et al. |
| 8,574,485 B2 | 11/2013 | Kramer |
| 8,715,832 B2 | 5/2014 | Ederer et al. |
| 8,727,672 B2 | 5/2014 | Ederer et al. |
| 8,741,194 B1 | 6/2014 | Ederer et al. |
| 8,911,226 B2 | 12/2014 | Gunther et al. |
| 8,951,033 B2 | 2/2015 | Höchsmann et al. |
| 8,956,140 B2 | 2/2015 | Hartmann |
| 8,956,144 B2 | 2/2015 | Grasegger et al. |
| 8,992,205 B2 | 3/2015 | Ederer et al. |
| 9,174,391 B2 | 11/2015 | Hartmann et al. |
| 9,174,392 B2 | 11/2015 | Hartmann |
| 9,242,413 B2 | 1/2016 | Hartmann et al. |
| 9,321,934 B2 | 4/2016 | Mögele et al. |
| 9,327,450 B2 | 5/2016 | Hein et al. |
| 9,333,709 B2 | 5/2016 | Hartmann |
| 9,358,701 B2 | 6/2016 | Gnuchtel et al. |
| 2001/0045678 A1 | 11/2001 | Kubo et al. |
| 2001/0050031 A1 | 12/2001 | Bredt et al. |
| 2002/0016387 A1 | 2/2002 | Shen |
| 2002/0026982 A1 | 3/2002 | Bredt et al. |
| 2002/0079601 A1 | 6/2002 | Russell et al. |
| 2002/0090410 A1 | 7/2002 | Tochimoto et al. |
| 2002/0111707 A1 | 8/2002 | Li et al. |
| 2002/0155254 A1 | 10/2002 | McQuate et al. |
| 2002/0167100 A1 | 11/2002 | Moszner et al. |
| 2003/0004599 A1 | 1/2003 | Herbak |
| 2003/0065400 A1 | 4/2003 | Beam et al. |
| 2003/0069638 A1 | 4/2003 | Barlow et al. |
| 2003/0083771 A1 | 5/2003 | Schmidt |
| 2003/0113729 A1 | 6/2003 | DaQuino et al. |
| 2003/0114936 A1 | 6/2003 | Sherwood et al. |
| 2004/0003738 A1* | 1/2004 | Imiolek ................. B22F 3/1055 101/480 |
| 2004/0012112 A1 | 1/2004 | Davidson et al. |
| 2004/0025905 A1 | 2/2004 | Ederer et al. |
| 2004/0026418 A1 | 2/2004 | Ederer et al. |
| 2004/0035542 A1 | 2/2004 | Ederer et al. |
| 2004/0036200 A1 | 2/2004 | Patel et al. |
| 2004/0038009 A1 | 2/2004 | Noel et al. |
| 2004/0045941 A1 | 3/2004 | Herzog et al. |
| 2004/0056378 A1 | 3/2004 | Bredt et al. |
| 2004/0084814 A1 | 5/2004 | Boyd et al. |
| 2004/0094058 A1 | 5/2004 | Kasperchik et al. |
| 2004/0104515 A1 | 6/2004 | Swanson et al. |
| 2004/0112523 A1 | 6/2004 | Crom |
| 2004/0138336 A1 | 7/2004 | Bredt et al. |
| 2004/0145088 A1 | 7/2004 | Patel et al. |
| 2004/0170765 A1 | 9/2004 | Ederer et al. |
| 2004/0187714 A1 | 9/2004 | Napadensky et al. |
| 2004/0207123 A1 | 10/2004 | Patel et al. |
| 2004/0231593 A1 | 11/2004 | Edwards |
| 2004/0239009 A1 | 12/2004 | Collins et al. |
| 2005/0003189 A1 | 1/2005 | Bredt et al. |
| 2005/0017386 A1 | 1/2005 | Harrysson |
| 2005/0017394 A1 | 1/2005 | Hochsmann et al. |
| 2005/0074511 A1 | 4/2005 | Oriakhi et al. |
| 2005/0093194 A1 | 5/2005 | Oriakhi et al. |
| 2005/0167872 A1 | 8/2005 | Ederer et al. |
| 2005/0174407 A1 | 8/2005 | Johnson et al. |
| 2005/0179167 A1 | 8/2005 | Hachikian |
| 2005/0212163 A1 | 9/2005 | Bausinger et al. |
| 2005/0218549 A1 | 10/2005 | Farr et al. |
| 2005/0280185 A1* | 12/2005 | Russell ................. B28B 1/001 264/308 |
| 2006/0105102 A1 | 5/2006 | Hochsmann et al. |
| 2006/0108090 A1 | 5/2006 | Ederer et al. |
| 2006/0159896 A1 | 7/2006 | Pfeifer et al. |

(56) References Cited

U.S. PATENT DOCUMENTS

| | | |
|---|---|---|
| 2006/0176346 A1 | 8/2006 | Ederer et al. |
| 2006/0208388 A1 | 9/2006 | Bredet et al. |
| 2006/0237159 A1 | 10/2006 | Hochsmann |
| 2006/0251535 A1 | 11/2006 | Pfeifer et al. |
| 2006/0254467 A1 | 11/2006 | Farr et al. |
| 2007/0045891 A1 | 3/2007 | Martinoni |
| 2007/0057412 A1 | 3/2007 | Weiskopf et al. |
| 2007/0126157 A1 | 6/2007 | Bredt |
| 2007/0238056 A1 | 10/2007 | Baumann et al. |
| 2008/0001331 A1* | 1/2008 | Ederer ............... B22F 3/1055 264/460 |
| 2008/0018018 A1 | 1/2008 | Nielsen et al. |
| 2008/0047628 A1 | 2/2008 | Davidson et al. |
| 2008/0138515 A1 | 6/2008 | Williams |
| 2008/0187711 A1 | 8/2008 | Alam et al. |
| 2008/0233302 A1 | 9/2008 | Elsner |
| 2008/0237933 A1 | 10/2008 | Hochsmann et al. |
| 2008/0241404 A1 | 10/2008 | Allaman et al. |
| 2008/0260945 A1 | 10/2008 | Ederer et al. |
| 2009/0011066 A1 | 1/2009 | Davidson et al. |
| 2009/0068376 A1 | 3/2009 | Philippi et al. |
| 2009/0261497 A1 | 10/2009 | Ederer et al. |
| 2010/0007062 A1 | 1/2010 | Larsson et al. |
| 2010/0021580 A1* | 1/2010 | Swanson ............... B29C 31/042 425/132 |
| 2010/0207288 A1 | 8/2010 | Enrico |
| 2010/0212584 A1 | 8/2010 | Ederer et al. |
| 2010/0243123 A1 | 9/2010 | Ederer |
| 2010/0244301 A1 | 9/2010 | Ederer et al. |
| 2010/0247742 A1 | 9/2010 | Shi et al. |
| 2010/0272519 A1 | 10/2010 | Ederer et al. |
| 2010/0279007 A1 | 11/2010 | Briselden et al. |
| 2010/0291314 A1 | 11/2010 | Kashani-Shirazi |
| 2010/0323301 A1 | 12/2010 | Tang et al. |
| 2011/0059247 A1 | 3/2011 | Kuzusako et al. |
| 2011/0177188 A1 | 7/2011 | Bredt et al. |
| 2011/0223437 A1 | 9/2011 | Ederer et al. |
| 2011/0308755 A1 | 12/2011 | Hochsmann |
| 2012/0046779 A1 | 2/2012 | Pax et al. |
| 2012/0094026 A1 | 4/2012 | Ederer et al. |
| 2012/0097258 A1 | 4/2012 | Hartmann |
| 2012/0113439 A1 | 5/2012 | Ederer et al. |
| 2012/0126457 A1 | 5/2012 | Abe et al. |
| 2012/0291701 A1 | 11/2012 | Grasegger et al. |
| 2013/0000549 A1 | 1/2013 | Hartmann et al. |
| 2013/0004610 A1 | 1/2013 | Hartmann et al. |
| 2013/0026680 A1 | 1/2013 | Ederer et al. |
| 2013/0029001 A1 | 1/2013 | Gunther et al. |
| 2013/0092082 A1 | 4/2013 | Ederer et al. |
| 2013/0189434 A1 | 7/2013 | Randall et al. |
| 2013/0199444 A1 | 8/2013 | Hartmann |
| 2013/0234355 A1 | 9/2013 | Hartmann et al. |
| 2013/0302575 A1 | 11/2013 | Mogele et al. |
| 2013/0313757 A1 | 11/2013 | Kashani-Shirazi |
| 2014/0048980 A1 | 2/2014 | Crump et al. |
| 2014/0202381 A1 | 7/2014 | Ederer et al. |
| 2014/0202382 A1 | 7/2014 | Ederer |
| 2014/0212677 A1 | 7/2014 | Gnuchtel et al. |
| 2014/0227123 A1 | 8/2014 | Gunster |
| 2014/0271961 A1 | 9/2014 | Khoshnevis |
| 2014/0306379 A1 | 10/2014 | Hartmann et al. |
| 2014/0322501 A1 | 10/2014 | Ederer et al. |
| 2015/0042018 A1 | 2/2015 | Gunther et al. |
| 2015/0069659 A1 | 3/2015 | Hartmann |
| 2015/0110910 A1 | 4/2015 | Hartmann et al. |
| 2015/0165574 A1 | 6/2015 | Ederer et al. |
| 2015/0210822 A1 | 7/2015 | Ederer et al. |
| 2015/0224718 A1 | 8/2015 | Ederer et al. |
| 2015/0266238 A1 | 9/2015 | Ederer et al. |
| 2015/0273572 A1 | 10/2015 | Ederer et al. |
| 2015/0290881 A1 | 10/2015 | Ederer et al. |
| 2015/0375418 A1 | 12/2015 | Hartmann |
| 2015/0375419 A1 | 12/2015 | Gunther et al. |
| 2016/0001507 A1 | 1/2016 | Hartmann et al. |
| 2016/0052165 A1 | 2/2016 | Hartmann |
| 2016/0052166 A1 | 2/2016 | Hartmann |
| 2016/0107386 A1 | 4/2016 | Hartmann et al. |
| 2016/0114533 A1 | 4/2016 | Grassegger et al. |
| 2016/0263828 A1 | 9/2016 | Ederer et al. |
| 2016/0303762 A1 | 10/2016 | Gunther |
| 2016/0311167 A1 | 10/2016 | Gunther et al. |
| 2016/0311210 A1 | 10/2016 | Gunther et al. |

FOREIGN PATENT DOCUMENTS

| | | |
|---|---|---|
| DE | 4102260 A1 | 7/1992 |
| DE | 4305201 C1 | 4/1994 |
| DE | 4 325 573 | 2/1995 |
| DE | 29506204.5 U1 | 6/1995 |
| DE | 19525307 A1 | 1/1997 |
| DE | 19530295 C1 | 1/1997 |
| DE | 19528215 A1 | 2/1997 |
| DE | 29701279 U1 | 5/1997 |
| DE | 69031808 T2 | 4/1998 |
| DE | 201 22 639 U1 | 11/2006 |
| DE | 10 2006 040 305 A1 | 3/2007 |
| DE | 102006029298 A1 | 12/2007 |
| DE | 102006030350 | 1/2008 |
| DE | 102009036153 A1 | 2/2011 |
| DE | 102010013733 | 10/2011 |
| DE | 102011053205 A1 | 3/2013 |
| DE | 102015006363 A1 | 12/2016 |
| EP | 361847 B1 | 4/1990 |
| EP | 0431924 B1 | 6/1991 |
| EP | 0500225 A1 | 8/1992 |
| JP | S62275734 A | 11/1987 |
| JP | 2003136605 A | 5/2003 |
| JP | 2004082206 A | 3/2004 |
| JP | 2009202451 A | 9/2009 |
| WO | 01/40866 A2 | 6/2001 |
| WO | 01/72502 A1 | 10/2001 |
| WO | 2001/078969 A2 | 10/2001 |
| WO | 2004/014637 A1 | 2/2004 |
| WO | 2005/070657 A1 | 8/2005 |
| WO | WO 2005070657 A1 * | 8/2005 ......... B29C 67/0055 |
| WO | 2005/097476 A2 | 10/2005 |
| WO | 2008/049384 A1 | 5/2008 |
| WO | 2008061520 A2 | 5/2008 |
| WO | 2011063786 A1 | 6/2011 |
| WO | 2013075696 A1 | 5/2013 |
| WO | 2014090207 A1 | 6/2014 |
| WO | 2014166469 A1 | 10/2014 |
| WO | 2015078430 A1 | 6/2015 |
| WO | 2015081926 A1 | 6/2015 |
| WO | 2015085983 A2 | 6/2015 |
| WO | 2015090265 A1 | 6/2015 |
| WO | 2015090567 A1 | 6/2015 |
| WO | 2015096826 A1 | 7/2015 |
| WO | 2015149742 A1 | 10/2015 |
| WO | 2015180703 A1 | 12/2015 |
| WO | 2016019937 A1 | 2/2016 |
| WO | 2016019942 A1 | 2/2016 |
| WO | 2016058577 A1 | 4/2016 |
| WO | 2016095888 A1 | 6/2016 |
| WO | 2016101942 A1 | 6/2016 |
| WO | 2016146095 A1 | 9/2016 |

OTHER PUBLICATIONS

International Preliminary Report on Patentability and Written Opinion, PCT/DE2012/000870, dated Mar. 4, 2014.

European Office Action, Application No. 12775432.3 dated Aug. 6, 2015.

Marcus et al., Solid Freedom Fabrication Proceedings, Nov. 1993.

Cima et al., "Computer-derived Microstructures by 3D Printing: Bio- and Structural Materials," SFF Symposium, Austin, TX, 1994.

Marcus, et al., Solid Freeform Fabrication Proceedings, Sep. 1995, p. 130-33.

Gebhart, Rapid Prototyping, pp. 118-119, 1996.

Feature Article—Rapid Tooling—Cast Resin and Sprayed Metal Tooling by Joel Segal, Apr. 2000.

EOS Operating Manual for Laser Sintering Machine with Brief Summary dated Feb. 22, 2005.

(56) References Cited

OTHER PUBLICATIONS

Sachs, E., P. Williams, D. Brancazio, M. Cima, and K. Kremmin, Three dimensional printing: Rapid Tooling and Prototypes Directly from a CAD Model. In Proceedings of Manufacturing International 1990 (Atlanta, GA, Mar. 25-28). ASME, New York, 1990, pp. 131-136.

Sachs et al., "Three-Dimensional Printing: Rapid Tooling and Prototypes Directly from a CAD Model", Massachusetts Institute of Technology, pp. 143-151, Jan. 1990.

Williams, "Feasibility Study of Investment Casting Pattern Design by Means of Three Dimensional Printing", Department of Mechanical Engineering, pp. 2-15.

Jacobs et al., 2005 SME Technical Paper, title "Are QuickCast Patterns Suitable for Limited Production?".

* cited by examiner

6

A-A

A-A

A-A

A-A

A-A

DEVICE FOR CONSTRUCTING MODELS IN LAYERS

CLAIM OF PRIORITY

This application is a national phase filing under 35 USC § 371 from PCT Application serial number PCT/DE2012/000870 filed on Aug. 29, 2012, and claims priority therefrom. This application further claims priority from German Patent Application Number DE 10 2011 111 498.3 filed on Aug. 31, 2011, incorporated herein by reference.

The invention relates to a device and a device [sic; method] for constructing models in layers according to the definition of the species in Claim 1 and Claim 8, respectively.

A method for producing three-dimensional objects from computer data is described in the European patent specification EP 0 431 924 B1. A first material, a particulate material in this case, is applied in a thin layer onto a building platform, which, if necessary, is surrounded by a container, and a second material, which may form a solid with the first material, is subsequently applied thereupon. According to EP 0 431 924 B1, a particulate material is provided, for example, as the first material, and a binder material is then selectively printed on the particulate material using a print head. The particle area onto which the binder is printed sticks together and solidifies under the influence of the binder and, if necessary, an additional hardener. The platform is then lowered by a distance of one layer thickness into a build cylinder and provided with a new layer of particulate material, which is also printed as described above. These steps are repeated until a certain, desired height of the object is achieved. A three-dimensional object is thus produced from the printed and solidified areas.

The object produced from the solidified particulate material as described above is embedded in loose particulate material and subsequently removed therefrom.

Other powder-supported rapid prototyping processes work in a similar manner, for example selective laser sintering or electron beam sintering, in which a loose particulate material is also deposited in layers and selectively solidified with the aid of a controlled physical radiation source.

All these methods are referred to collectively below as "three-dimensional printing methods" or "3D printing methods."

Another method for constructing a layer body from loose particulate material is known from DE 10 2006 030 350 A1. In this case, the components are created on a surface without a surrounding molding box. Instead, a wall is continuously constructed around the surface during the traversing movement, just like the component itself, and prevents unbound particulate material from flowing off the surface. The entire process also takes place in such a way that the building platform on which the part is created does not move vertically. Instead, a support frame, on which the components are placed for generating the layers, is moved layer by layer in the vertical direction.

A device in which a support frame including the layering tools is raised layer by layer is described in the subsequently published patent application DE 10 2010 013 733.

However, problems may arise with an approach of this type, since the positioning unit contained therein raises not only the layering tools but also the vertical positioning units and a heavy support frame in the Z direction, so that the support frame must have a rigid design and can be reasonably attached only at a few points (preferably the 4 gantry points). However, a rigid design of the support frame results in an extremely heavy design, which, in turn, places strict demands on the Z axis. Above a certain length, the technical complexity required therefor may prove to be no longer economical.

It has furthermore been demonstrated that the ends of the support frame project outward to a great extent and thus tend to vibrate as the traveling distance on the horizontal plane increases. This is promoted even further by different system components, such as a vibrationally excited coater, vibration actuators for improving the flow of materials within the material supply chain and accelerations of the positioning units of the process tools.

In addition, an axis system having multiple axis units must also meet very strict accuracy requirements. A suitable movement must be achieved by high production accuracies or a relatively complex adjustment.

A method for applying the entire building material by means of a direct printing method, using a portal-like print head disposed over a surface, is furthermore known from EP 0 500 225 A1.

On this basis, the object of the present invention is to provide a simpler, expandable and easily adjustable device and an easy and versatile method of the type mentioned above.

The object is achieved by the embodiments described in greater detail in Claims 1 and 12.

Advantageous embodiments of the invention are described in the subclaims.

In one aspect, the invention relates to a device for constructing models in layers, wherein an area for constructing models, preferably a building platform, and a material applying device for applying material to the area are provided, the material applying device being movably disposed over the area, the material applying device is designed as a portal in such a way that it is movable over the area at least via two linear guides situated on opposite sides of the area, and the material applying device is situated around the area in such a way that a portal is formed by at least two sections which extend laterally with respect to the area. According to the present invention, at least one additional material applying device is provided for applying an additional material to the area.

According to the present invention, the linear guides are provided, and the material applying device is disposed around the surface in such a way that a portal is formed by at least two sections extending laterally with respect to the surface.

A surface is understood to be an area onto which material is applied for constructing models. This may be a separate building platform or only an area of a base surface.

The surface does not necessarily have to correspond to the building material application plane or be parallel thereto. For example, it could be possible that the building material applying plane has an angle to the surface for a continuous construction process.

The material applying device is a device for applying material to the surface. This may be, for example, a material coater or a liquid coater for applying layers. For example, a print head for selectively applying material is also conceivable for this purpose.

The material applying device is provided for a material which is suitable for the particular 3D method used.

For example, it would be possible for the one or multiple materials to be applied in liquid and/or solid form in layers as film or as particulate material and/or printed and/or extruded. For example, radiation sources such as lasers or LED exposure heads may furthermore be provided in order to carry out, among other things, a selective laser process or sintering process or simply a hardening process.

The material applying device or multiple material applying devices are therefore adapted to the particular construction process used.

For example, it is therefore also possible to apply material in layers in liquid or solid form and to then selectively apply a second material which may be hardened with the first material, using a second material applying device. The second material applying device may be in engagement with a linear guide together with the first material applying device, or it may be in engagement with a linear guide separately from the first material applying device.

A use in a printing method would also be conceivable, in which material is applied directly by a print head, for example polyjet modeling or multijet modeling, or, in extrusion methods, by applying material directly using a nozzle, for example fused deposition modeling. If this is the case, the material applying device could include a particulate material coating device and/or a print head and/or an extruder and/or a film coater.

The linear guides are device parts which are suitable for guiding the portal parts in a linear direction. For example, it would be conceivable for the one building platform to be disposed on a base plane and for two profiles to be disposed on opposite sides, the portal parts being hinged to the profiles and linearly moveable therewith.

One advantage of the present invention has proven to be that the entire support frame does not have to be lengthened and reconfigured in the event that the positioning length of a piece of equipment needs to be increased, but instead a longer linear guide must simply be selected. All other components remain identical.

Moreover, the material applying device may be provided on a portal which is controlled via stable linear guides which may be fastened, for example, to the floor. The structure of a device according to the invention is thus very stable and requires only a very small additional setup area.

Since only portals and no complex racks are provided, the created mold is easily accessible at the end of a building process.

According to one preferred embodiment of the present invention, the additional material applying device is also provided on the portal so that the advantages described above also apply hereto.

To make the application actions of the two material applying devices slightly more independent of each other and possibly even offset in time but partially also simultaneous, it could also be provided that the additional material applying device is provided on an additional portal.

According to one preferred embodiment of the present invention, the material applying device includes a particulate material coating device and/or a print head.

For example, a particulate material layering device as well as a print head for selective application of the binder material suitable for the particular particulate material may be provided on a portal.

It is furthermore possible for a portal to have a light source, a radiation source and/or a heat source.

It has also proven to be advantageous if the material applying device in a device according to the invention is movably disposed essentially perpendicularly to the surface. This means that the material applying device is adjustable in height so that a device of this type may also be used for systems in which the building platform on which an object is constructed is not adjustable in height.

It has been demonstrated that, in an embodiment of this type, a movement of the material applying device, the additional material applying device and the light, radiation and/or heat source may take place essentially perpendicularly to the application plane, preferably along the portal parts.

Like the first portal, the additional portal part may be in engagement with the linear guide or with an additional linear guide. In any case, however, the portal parts should preferably be movable on the one or more linear guides independently of each other.

If two portals are now provided, it may be particularly advantageous if the two material applying devices are capable of being passed under or passed over. This means that one portal may pass under the other.

If the device according to the invention is provided in this manner, coating can take place in both directions of travel. Empty runs are avoided thereby. This is also advantageous, in particular, if the print width of the print heads used equals the width of the build space.

According to another preferred embodiment of the device according to the invention, at least one peripheral device of the material applying device is fixedly positioned in the device and is approachable by the applying device regardless of the current build height.

Peripheral devices are understood to be, in particular, the cleaning unit for the print head or the material feeding system for the coater. If these devices are not fixedly positioned on the portal but are fixedly positioned elsewhere in the device, they do not have to be raised together with the portal.

According to another aspect of the present invention, a method for constructing models in layers is also provided, a surface for constructing models, preferably a building platform, and at least one material applying device for applying material to the surface being provided.

The material applying device moves over the surface along at least two linear guides situated on opposite sides of the surface, in the direction of the application plane.

The portal is disposed in such a way that the material applying device moves over the area at least along two linear guides disposed on opposite sides of the area, and the portal is disposed around the area in such a way that at least two sections extending laterally with respect to the area form a portal. According to the present invention, at least one additional material applying device is provided, possibly on an additional portal, and an additional material is applied to the area.

The linear guides are preferably disposed below the material applying device and are in engagement at least via one portal part which extends upward essentially in a perpendicular direction with respect to the building platform, and the two portal parts are connected to each other at least via the material applying device, and the material applying device moves over the surface along the linear guides.

According to one preferred embodiment of the present invention, the material applying device also moves perpendicularly to the surface, which is advantageous, in particular, when using building platforms which are not adjustable in height.

If, in one preferred embodiment of the present invention, multiple independent portals are used, these portals may carry out different building processes simultaneously. This means that different, independent building processes may take place in different areas on a surface.

In addition, it would also be conceivable for one common building process to be carried out simultaneously by multiple independent portals.

According to even another preferred embodiment, the at least two portals may be able to pass under or pass over each other during or after a process step.

For the purpose of detailed explanation, the invention is illustrated on the basis of preferred exemplary embodiments in the following drawings.

According to the present invention, a device and a method, respectively, for manufacturing three-dimensional models by means of 3D printing on a surface are described, material applying devices (for example, a particulate material coating unit or a print head unit) are provided for the purpose of applying the particular material to a surface. According to the present invention, the material applying devices are moved vertically on one or multiple portals.

Figure 1:
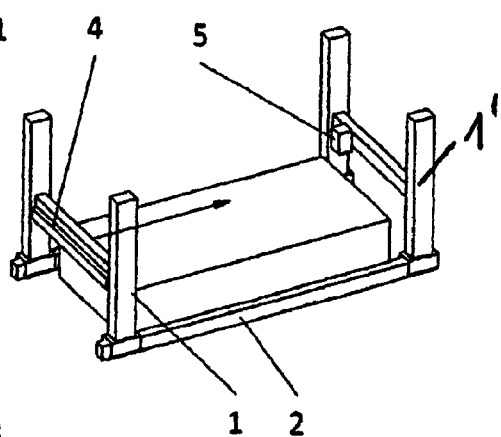
FIGS. 1 through 4 show a method sequence according to one preferred embodiment of the present invention, wherein a powder material coater and a print head have their own portals.
Figure 2:
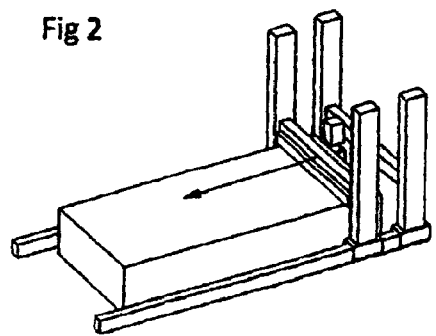
Figure 3:
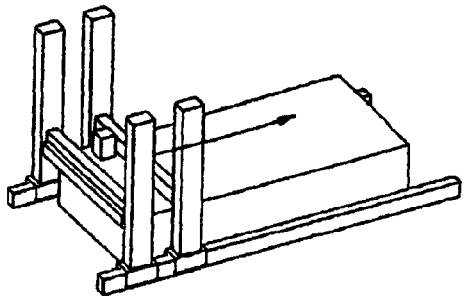
Figure 4:
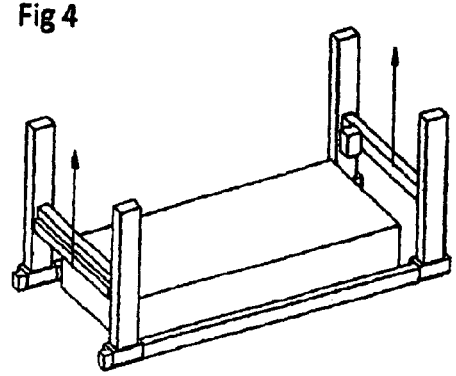

FIGS. 1 through 4 show a sequence of a method according to the invention according to a preferred embodiment. In this case, on a surface 9, particulate material is applied to the surface 9 using a coater 4. Coater 4 is contained in portal 1. Portal 1 moves over the surface on linear units 2. Afterwards, portal 1 moves back to its initial position (see FIG. 2). Portal 1', which contains print head 5, then also moves independently on linear units 2, which are fixedly connected to the floor (FIG. 3). Both material feed units 4, 5 are then moved upward by a distance of one layer height along the portal side parts, which is illustrated in FIG. 4, and the described process may start again.

The embodiments described with reference to FIGS. 1 through 4 have a separate portal 1, 1' for each material feed system. However, it is also possible to mount all layering tools on only one portal (see reference numeral 8 in FIG. 10).

If multiple portals 1, 1' are used, it is possible to provide each portal 1, 1' with a separate drive and to use only one common guide rail 2. However, it is also possible to assign a separate linear unit 2 (drive with guiding elements) to each portal.

In a method for constructing models with the aid of particulate material and selectively printing the particulate material, a distinction is made between the following directions of travel:

Direction of travel for positioning the print head

Direction of travel for the printing pass of the print head

Coating direction of the coater

The direction in which the longest pass is situated depends on the method or the printing strategy. It is deemed to be practical to fixedly connect the longest axis (e.g., the axis in the coating direction) to the floor.

Fixedly connecting the guiding units to the floor rules out flexing and vibrations independently of the positioning length.

By eliminating a vertically moved support frame, as known from the prior art, costs and effort in the layout, design, manufacture, transport and assembly of the device are significantly reduced in an embodiment according to the invention.

If a machine is to be enlarged, this may be done with comparatively little cost and effort.

Assembly is reduced to only replacing or expanding the linear units. In a practical design, only the guiding elements need to be lengthened.

The applying units and the peripherals (print head cleaning system, print head parking station, coater filling station) may be optionally moved as well or fixedly positioned next to the building platform.

By constructing the objects without a molding box, the size of the build space may be varied.

To keep the build time as short as possible, it may be useful to allow the associated peripheral devices to travel along with the corresponding portals (reference numeral 8 in FIG. 10) so that no additional passes to the peripheral devices are necessary.

Figure 5:
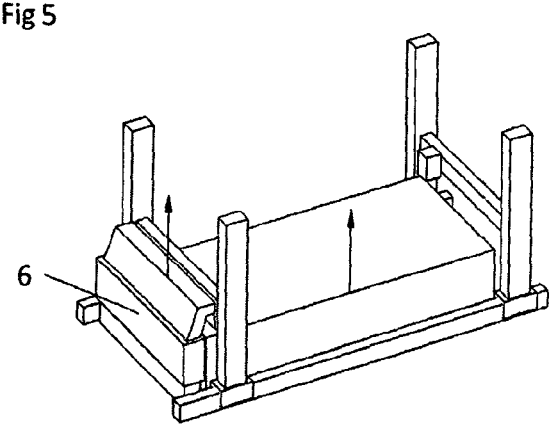
FIGS. 5 and 6 show a height-adjustable peripheral device according to another preferred embodiment, which adapts to the building height.
Figure 6:
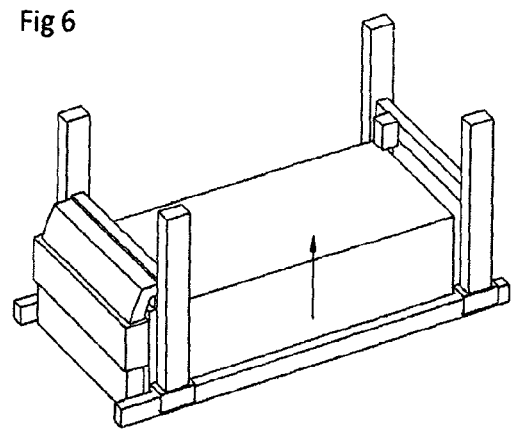

However, the peripheral devices 6 may also be disposed on the edge of the build space in a stationary manner. They may be positioned in this location, for example in the vertical direction, using a separate lifting device according to the current build or tool height (FIGS. 5 and 6).

Peripheral device 6 has its own lifting device and may thus adapt to the current build height and thus to the vertical position of the material applying device or the hardening device. The difference between FIG. 5 and FIG. 6 is that the peripheral device and the component as well as the tool are higher in FIG. 6.

Since an applying device on a portal may be positioned in at least two directions, it is possible to fix associated peripheral devices 7 in place so that they do not move.

Figure 8:
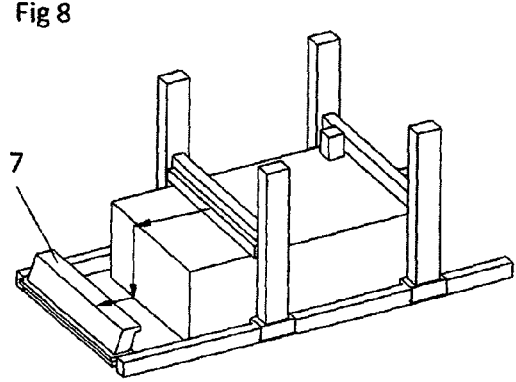
FIGS. 8 and 9 show a stationary peripheral device.
Figure 9:
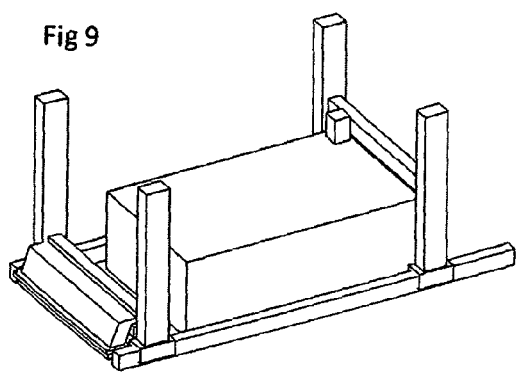

In this case, peripheral device 7 is approached by applying unit 4, 5 directly (FIGS. 8 and 9).

Figure 7:
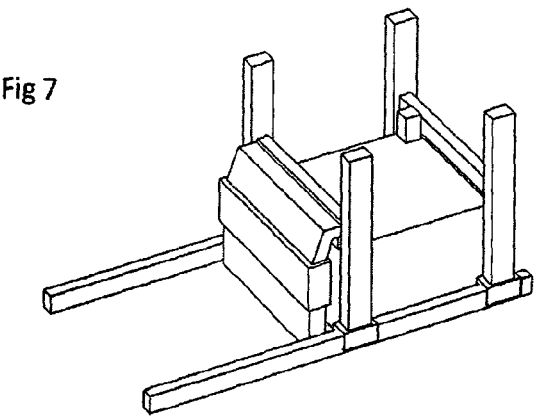
FIG. 7 shows a height-adjustable peripheral device according to another preferred embodiment, which adapts to the size of the build space.

If peripheral devices 6 do not also move on the portal, their position may be adapted to the size of the build space before construction begins (FIG. 7).

This option represents a preferred, cost-effective approach, in particular if a vertical positioning of the peripheral devices and process media is complicated.

In one particular embodiment, a portal supports all applying units and the associated peripheral devices as well as a separate linear drive. This makes it possible to dispose several of these portals one after the other and thereby save space. Multiple portals may thus be used to construct large parts quickly. Furthermore, multiple components may be created in parallel (FIGS. 10 through 12).

Figure 10:
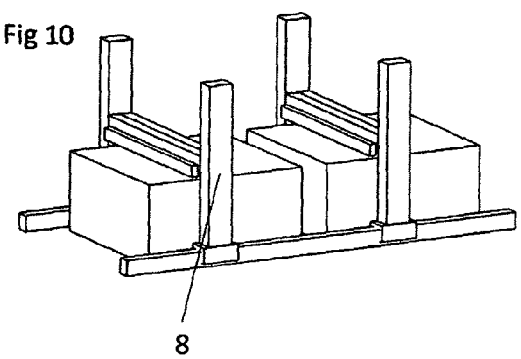
FIG. 10 shows a preferred embodiment of the present invention in a design which includes individual portals.

FIG. 10 shows another preferred embodiment of the invention, in which multiple portals are provided. Each portal has the complete set of applying units and corresponding peripheral devices. Each portal acts as an independent machine and creates a separate component.

Figure 11:
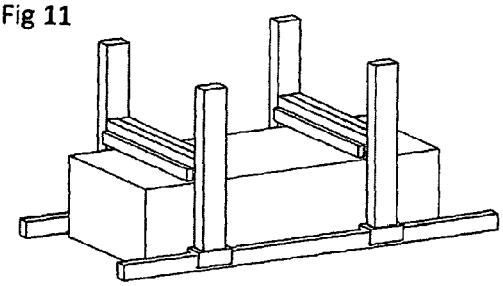
FIG. 11 shows an embodiment according to FIG. 10, wherein two individual portals together create one component.

FIG. 11 shows the same device setup as in FIG. 10; however, the two individual portals together create one component.

Figure 12:
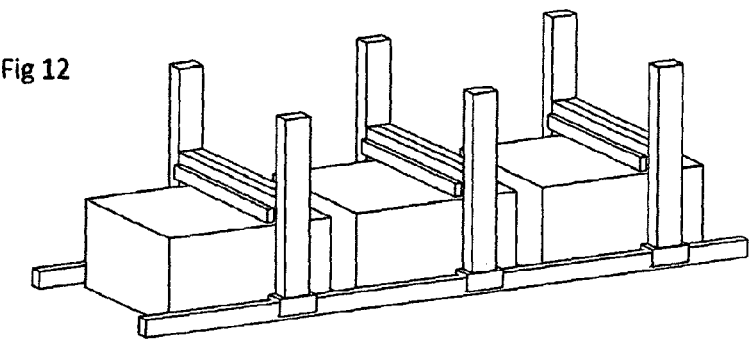
FIG. 12 shows a device according to the invention according to one preferred embodiment, in which three individual portals create independent components.

This setup may be expanded as needed; for example, FIG. 12 shows three individual portals which create separate components independently of each other.

If lifting axes are located on a traversing portal, they may be removed from the production area entirely (FIG. 12). If the traveling distance is sufficiently great, a new building process may be started right next to the finished component.

Figure 13:
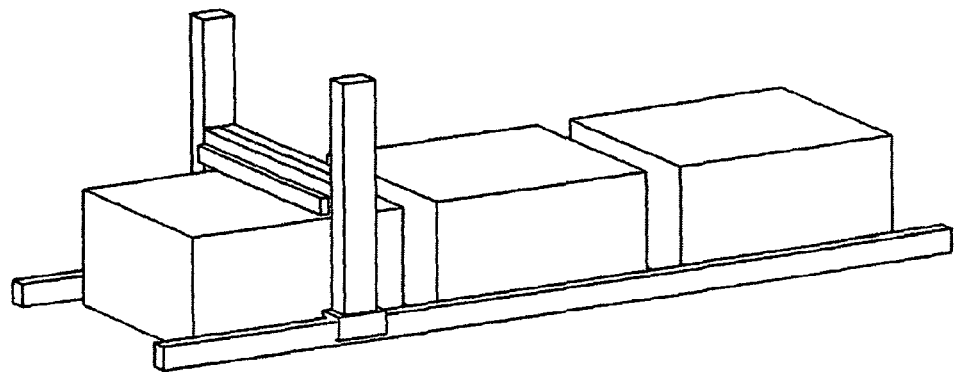
FIG. 13 shows a device according to the invention according to a preferred embodiment, in which one individual portal produces multiple components.

Moreover, it is also conceivable for one individual portal to produce multiple components in parallel or individually, as is illustrated in FIG. 13. The finished components are then fully accessible for further processing.

The method also provides the option of a new building strategy for the first time: While the coater and print head are always on the same level in conventional processes, both may move relative to each other in the Z direction herein.

According to a practical design and arrangement of the portals, one portal may pass beneath the other portal. In conventional processes, one applying device must constantly evade the other, so that empty runs result in which the particular applying device remains inactive.

Figure 14:
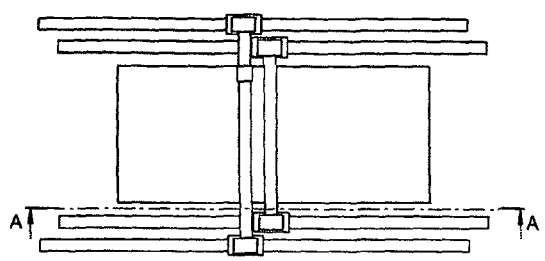
FIGS. 14 through 18 show the sequence of a method according to the invention according to a particularly preferred embodiment.
Figure 15:
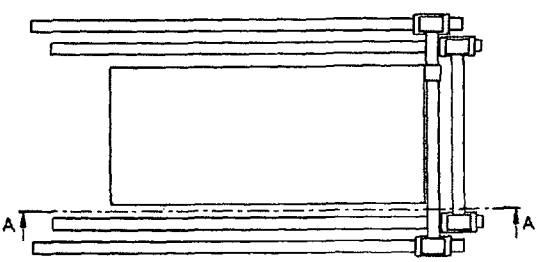
Figure 15:
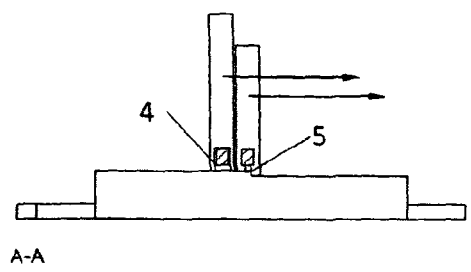
Figure 15:
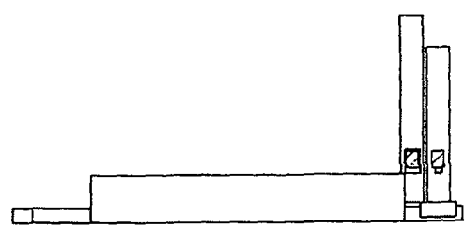
Figure 16:
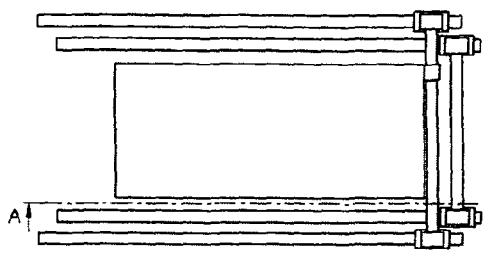
Figure 16:
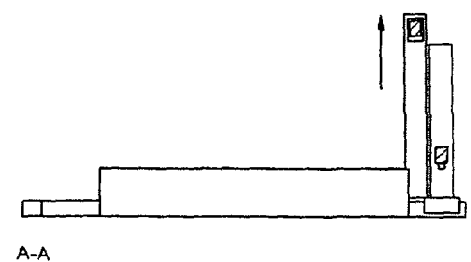
Figure 17:
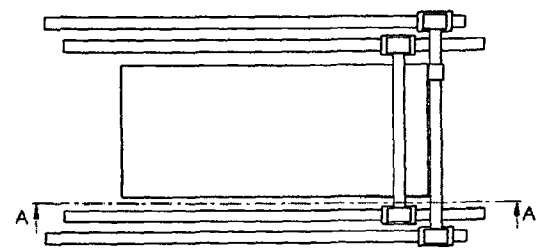
Figure 17:
Figure 18:
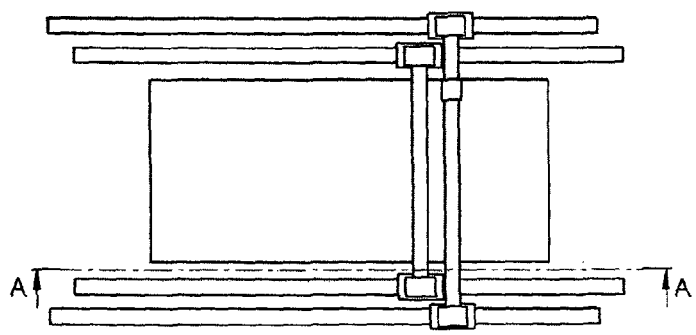
Figure 18:
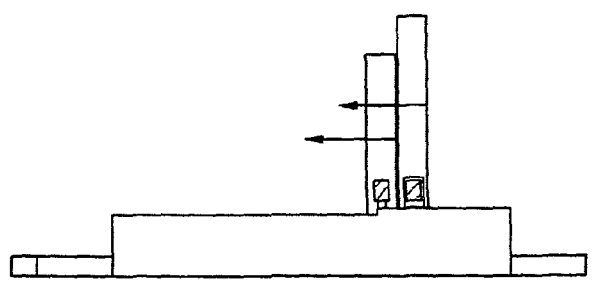

In FIGS. 14 and 15, the print head follows the coater and prints the freshly coated build space. The portal then lifts the print head in such a way that the coater portal may pass under it (FIG. 16), and the coater moves to a new Z position and applies a new layer (FIG. 17). In FIG. 18, the print head then returns to the current layer height and prints the freshly coated build space.

In this illustrated preferred embodiment, the guiding positions may be actively swapped. This is apparent in the illustrated sequence from FIG. 14 through FIG. 17. The print head first follows the coater and prints the freshly coated build space.

In the next step, the print head portal lifts the print head until the coater portal is able to pass beneath it. The coater again starts creating a fresh layer in the opposite direction. During this process, the print head moves to the current level and may generate the fresh layer. However, it is also possible for the coater to follow the print head, in which case the arrangements on the particular portals must be swapped.

This means that the coater is able to coat in each direction of travel for the first time, i.e., during each pass. Likewise, for the first time, print heads whose print widths equal the width of the build space may also coat in each direction of travel and during each pass. This significantly increases the efficiency of the overall system.

What is claimed is:

1. A device for constructing models in layers comprising:
a build platform having an area for constructing models, and
a material applying device for applying material to the area are provided,
wherein the material applying device is movably situated over the area,
the material applying device is arranged to form a portal in such a way that it is movable over the area at least via two linear guides disposed on opposite sides of the area, and the material applying device is disposed around the area in such a way that a first portal is formed with at least two sections which are laterally located with respect to the area, wherein the device for constructing models includes at least one additional material applying device for applying an additional material to the area arranged to form a second portal; wherein the material applying device and the additional material applying device independently move in a direction substantially perpendicular to the build platform.

2. The device according to claim 1, wherein the first portal and the second portal are independently moveable along the same or different linear guides.

3. The device according to claim 2, wherein each of the first and second portals includes a portal part which is substantially perpendicular to a top surface of the build platform and connects the corresponding material applying device to one of the linear guides, wherein the movements of the material applying device and the additional material applying device in the direction substantially perpendicular to the build platform includes a movement along the corresponding portal part.

4. The device of claim 3, wherein a light source, a radiation source, or a heat source is provided on one of the portals or on one or more additional portals.

5. The device of claim 2, wherein a light source, a radiation source, or a heat source is provided on one of the portals or on one or more additional portals.

6. The device of claim 1, wherein a light source, a radiation source, or a heat source is provided on one of the portals or on one or more additional portals.

7. The device of claim 1, wherein the additional material applying device has engagement with an additional linear guide for moving the second portal.

8. The device of claim 1, wherein the material applying devices include a particulate material coating device, a print head, an extruder, a film coater, or any combination thereof.

9. The device of claim 1, wherein at least one material applying device, light source, radiation source or heat source is movably disposed over the area.

10. The device according to claim 9, wherein a movement of either of the material applying devices, the light source, radiation source, heat source takes place along parts lateral to the first portal, the second portal, or an additional portal.

11. The device of claim 1, characterized in that one of the portals is able to pass under the other portal.

12. The device of claim 1, wherein at least one peripheral device is furthermore disposed in the device.

13. The device of claim 1, wherein
the second portal is moved by an engagement of the additional material applying device with an additional linear guide;
one of the material applying devices include a particulate material coating device and the other material applying device includes a print head;
a movement of each of the material applying devices takes place along parts lateral to the first or second portal; and
one of the first and second portals is able to pass over the other.

14. The device of claim 13, wherein at least one peripheral device is furthermore disposed in the device at a fixed height and is capable of being approached at the fixed height by the portal of the particulate material coating device independently of a build height.

15. The device of claim 1, wherein
the build platform and the linear guides are stationary in at least the vertical direction; and
the portal has a first opening that changes in area with the movement of the material applying device perpendicular to the build platform and the second portal has a second opening that changes in area with the movement of the additional material applying device perpendicular to the build platform, wherein the areas of the first and second openings are capable of changing independently.

16. The device of claim 1, wherein the material application device and the additional material application device each moves independently in a direction perpendicular to the linear guides.

17. A device for the layered construction of models comprising:
   i) a region for the construction of the models,
   ii) a first material application device for applying material onto the region, wherein the first material application device is arranged so as to be movable over the region, and the first material application device being arranged as a first portal such that it can be moved in a horizontal direction over the region via at least two linear guides arranged on opposite sides of the region, and the first material application device is further arranged around the region such that the first portal is formed with at least two portions extending laterally of the region; and
   iii) a second material application device for applying a further material onto the region, wherein the second material application device is provided at a second portal;
   wherein the first and second material application devices are movable in a direction substantially perpendicular to a construction platform in the region, wherein the second portal is in engagement with a further linear guide, and the first and second portals are independently movable on different linear guides.

18. The device of claim 17, wherein a light source, a radiation source, or a heat source is provided on the first portal, the second portal, or a different portal.

19. A device for the layered construction of models comprising:
   i) a region for the construction of the models,
   ii) a first material application device for applying material onto the region, wherein the first material application device is arranged so as to be movable over the region, and the first material application device being arranged as a first portal such that it can be moved in a horizontal direction over the region via at least two linear guides arranged on opposite sides of the region, and the first material application device is further arranged around the region such that the first portal is formed with at least two portions extending laterally of the region; and
   iii) a second material application device for applying a further material onto the region, wherein the second material application device is provided at a second portal;
   wherein the first and second material application devices are movable in a direction substantially perpendicular to a construction platform in the region, and the first and second portals are independently movable on different linear guides;
   wherein the first material application device includes a particulate material coating device and the second material application device includes a print head, an extruder, or a film coater, and the first material application device moves under the second material application device, or the second material application device moves under the first material application device.

20. A device for constructing models in layers comprising:
   a build platform having an area for constructing models;
   a first material applying device for applying a first material to the area, wherein the first material applying device is movably situated over the area;
   a second material applying device for applying a second material to the area, wherein the second material applying device is movably situated over the area;
   at least two linear guides disposed on opposite sides of the area;
   wherein the first material applying device includes a coater device, is arranged to form a first portal, and includes a first pair of lateral parts extending substantially in a direction perpendicular to the build platform connecting the coater device to two of the linear guides, wherein the coater device moves in a direction substantially perpendicular to the build platform along the first pair of lateral parts, and moves along the linear guides for traveling over the build platform;
   wherein the second material applying device includes a print head, an extruder, or a film coater, is arranged to form a second portal, and includes a second pair of lateral parts extending substantially in a direction perpendicular to the build platform connecting the print head, the extruder, or the film coater to two of the linear guides, wherein the print head, the extruder, or the film coater moves in a direction substantially perpendicular to the build platform along the second pair of lateral parts, and moves along the linear guides for traveling over the build platform.

* * * * *